(12) United States Patent
Aoyagi et al.

(10) Patent No.: US 8,867,527 B2
(45) Date of Patent: Oct. 21, 2014

(54) SPEECH PROCESSING PERIPHERAL DEVICE AND IP TELEPHONE SYSTEM

(75) Inventors: Hiromi Aoyagi, Kanagawa (JP); Shinji Usuba, Tokyo (JP); Hiroshi Hashizume, Saitama (JP); Hiroshi Kuboki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1115 days.

(21) Appl. No.: 11/918,208

(22) PCT Filed: Apr. 28, 2006

(86) PCT No.: PCT/JP2006/308985
§ 371 (c)(1),
(2), (4) Date: Oct. 11, 2007

(87) PCT Pub. No.: WO2007/004351
PCT Pub. Date: Jan. 11, 2007

(65) Prior Publication Data
US 2009/0080410 A1    Mar. 26, 2009

(30) Foreign Application Priority Data
Jun. 30, 2005  (JP) .................................. 2005-192004

(51) Int. Cl.
*H04L 12/66*  (2006.01)
*H04M 15/06*  (2006.01)
*H04M 1/60*  (2006.01)
*H04M 1/253*  (2006.01)

(52) U.S. Cl.
CPC .......... *H04M 1/2535* (2013.01); *H04M 1/6058* (2013.01)
USPC .................... 370/352; 455/575.2; 379/142.15

(58) Field of Classification Search
CPC ............ H04M 1/6066; H04M 1/0258; H04M 1/6041; H04M 1/0202; H04M 1/2535; H04M 7/0027; H04M 7/0039; H04M 15/56; H04M 2203/052; H04L 65/1069
USPC ........ 370/352–356; 379/387.01, 387.02, 395, 379/201.01, 201.03, 201.09, 201.12, 379/142.15; 381/74; 455/575.2; 709/220–223; 45/575.2
See application file for complete search history.

(56) References Cited

U.S. PATENT DOCUMENTS 6,717,801 B1 * 4/2004 Castell et al. ............ 361/679.41
(Continued)

FOREIGN PATENT DOCUMENTS

CN          1263676 A      8/2000
(Continued)

OTHER PUBLICATIONS

Nikkei Communications, "IP telephone Online", searched through Internet on May 16, 2005, "http://itpro.nikkeibp.co.jp/free/NCC/denwa/20050211/39/".

*Primary Examiner* — Wutchung Chu
(74) *Attorney, Agent, or Firm* — Rabin & Berdo, P.C.

(57) ABSTRACT

There are provided with an IP telephone system having both convenience of the softphone and durability of the hardphone, and a speech processing peripheral device (10) for the IP telephone system. The speech processing peripheral device as a peripheral device of an information processing device (20) is connected to the information processing device (20) for executing a call control program and functioning as a call controller. This speech processing peripheral device (10) includes a host connection means for sending/receiving an audio signal to/from the information processing device (20) and a speech processing means for executing speech processing in IP telephone communication. The IP telephone system according to the present invention includes the information processing device (20) for executing the call control program and functioning as the call controller and the speech processing peripheral device (10) according to the present invention, connected to the information processing device (20).

9 Claims, 7 Drawing Sheets

(56) References Cited

U.S. PATENT DOCUMENTS

| | | | |
|---|---|---|---|
| 6,763,226 B1* | 7/2004 | McZeal, Jr. | 455/90.2 |
| 7,486,965 B1* | 2/2009 | Hollister | 455/553.1 |
| 7,680,490 B2* | 3/2010 | Bloebaum et al. | 455/414.1 |
| 7,930,531 B2* | 4/2011 | Chow et al. | 713/2 |
| 2002/0162116 A1* | 10/2002 | Read et al. | 725/106 |
| 2004/0240418 A1* | 12/2004 | Yata et al. | 370/338 |
| 2005/0075894 A1* | 4/2005 | Bushey et al. | 705/1 |
| 2005/0099997 A1* | 5/2005 | Kuwabara et al. | 370/352 |
| 2005/0169245 A1* | 8/2005 | Hindersson | 370/352 |
| 2005/0180406 A1* | 8/2005 | Sagiv | 370/353 |
| 2005/0195778 A1* | 9/2005 | Bergs et al. | 370/338 |
| 2005/0271194 A1* | 12/2005 | Woods et al. | 379/202.01 |
| 2006/0062400 A1* | 3/2006 | Chia-Chun | 381/74 |
| 2006/0067513 A1* | 3/2006 | Maytal et al. | 379/395 |
| 2006/0093102 A1* | 5/2006 | McElvaney | 379/88.17 |
| 2006/0093104 A1* | 5/2006 | Maytal et al. | 379/93.28 |
| 2006/0111910 A1* | 5/2006 | Nelson | 704/270 |
| 2006/0183514 A1* | 8/2006 | Patton | 455/575.2 |
| 2006/0205349 A1* | 9/2006 | Passier et al. | 455/41.2 |
| 2006/0208066 A1* | 9/2006 | Finn et al. | 235/380 |
| 2007/0004473 A1* | 1/2007 | Clark et al. | 455/575.2 |
| 2007/0123251 A1* | 5/2007 | McElvaney | 455/426.1 |
| 2008/0025291 A1* | 1/2008 | Barkley et al. | 370/352 |

FOREIGN PATENT DOCUMENTS

| | | |
|---|---|---|
| CN | 1456976 A | 11/2003 |
| DE | 202005008640 | 7/2006 |
| JP | 2003-110667 | 4/2003 |
| JP | 2004-072256 | 3/2004 |
| JP | 2004-248239 | 9/2004 |
| WO | WO-98/52371 A1 | 11/1998 |

* cited by examiner

SPEECH PROCESSING PERIPHERAL DEVICE AND IP TELEPHONE SYSTEM

TECHNICAL FIELD

The present invention relates to a speech processing peripheral device and an IP telephone system. The present invention can be applied to a peripheral device of a personal computer (PC), wherein the peripheral device implements an IP telephone function together with a program on the PC, and can be applied to an IP telephone system using the peripheral device.

BACKGROUND ART

In recent years, what is called an "IP telephone" for enabling a telephone conversation through an IP network has come into wide use. A type of IP telephone that implements IP telephone functions such as call processing and audio signal processing by means of software on the PC is referred to as a softphone (see Non-patent document 1). The softphone has many advantages over an IP telephone set (hereafter referred to as a hardphone) implemented by the conventional hardware device, in terms of terminal cost, linkage with other services or functions, and the like.

Non-patent document 1: Nikkei Communications, "IP telephone ONLINE", searched through Internet on May 16, 2005, "http://itpro.nikkeibp.co.jp/free/NCC/denwa/20050211/39/".

DISCLOSURE OF INVENTION

Problems to be Solved by the Invention

However, in comparison with the hardphone, the softphone has the following problems.

The first problem is that it is hard to maintain a constant quality of an IP telephone service because the speech quality depends on the specifications of the PC (an operational clock frequency and internal A-D/D-A characteristics) and the number of applications running in parallel during a telephone conversation.

The second problem is that the IP telephone function is disabled if out-of-control, power-down, or the like occurs in the PC. Since the days of using an analog telephone, the power supply of a telephone set has been transparent to users. Accordingly, a user feels awkward to become aware of the power supply of the telephone set.

Therefore, there are needs of an IP telephone system which has both convenience of the softphone and durability of the hardphone and is inexpensive, and a device for the IP telephone system.

Means for Solving the Problems

First, a speech processing peripheral device according to the present invention executes a call control program, the speech processing peripheral device being a peripheral device of an information processing device functioning as a call controller, the speech processing peripheral device being connected to the information processing device. The speech processing peripheral device includes (1) a host connection means which sends/receives an audio signal to/from the information processing device, and (2) a speech processing means which executes speech processing in IP telephone communication.

Second, an IP telephone system according to the present invention includes an information processing device or devices which execute a call control program and functions as a call controller, and the speech processing peripheral device according to the present invention, which is connected to the information processing device.

Effects of the Invention

According to the speech processing peripheral device and the IP telephone system of the present invention, an information processing device provides a call control function by software, and a speech processing peripheral device provides a speech processing function by hardware. Accordingly, an inexpensive IP telephone system having both convenience of the softphone and durability of the hardphone can be provided.

DESCRIPTION OF THE REFERENCE SYMBOLS

1 IP telephone system; 10 speech processing peripheral device; 11 A-D/D-A section; 12 audio compression/expander; 13 IP packet processor; 14, 61 to 63 USB control section; 15 on-hook/off-hook instruction section; 16 headset direct-connection instruction section; 17 USB memory; 20, 20SBY PC (VoIP call controller); 30 USB connector; 40 headset; 50 IP network; 60 call channel selection device; 64 connection controller; 65 button detector.

BEST MODE FOR CARRYING OUT THE INVENTION (A) First Embodiment

A speech processing peripheral device and an IP telephone system according to the first embodiment of the present invention will be described below with reference to the drawings.

(A-1) Configuration of First Embodiment

Figure 1:
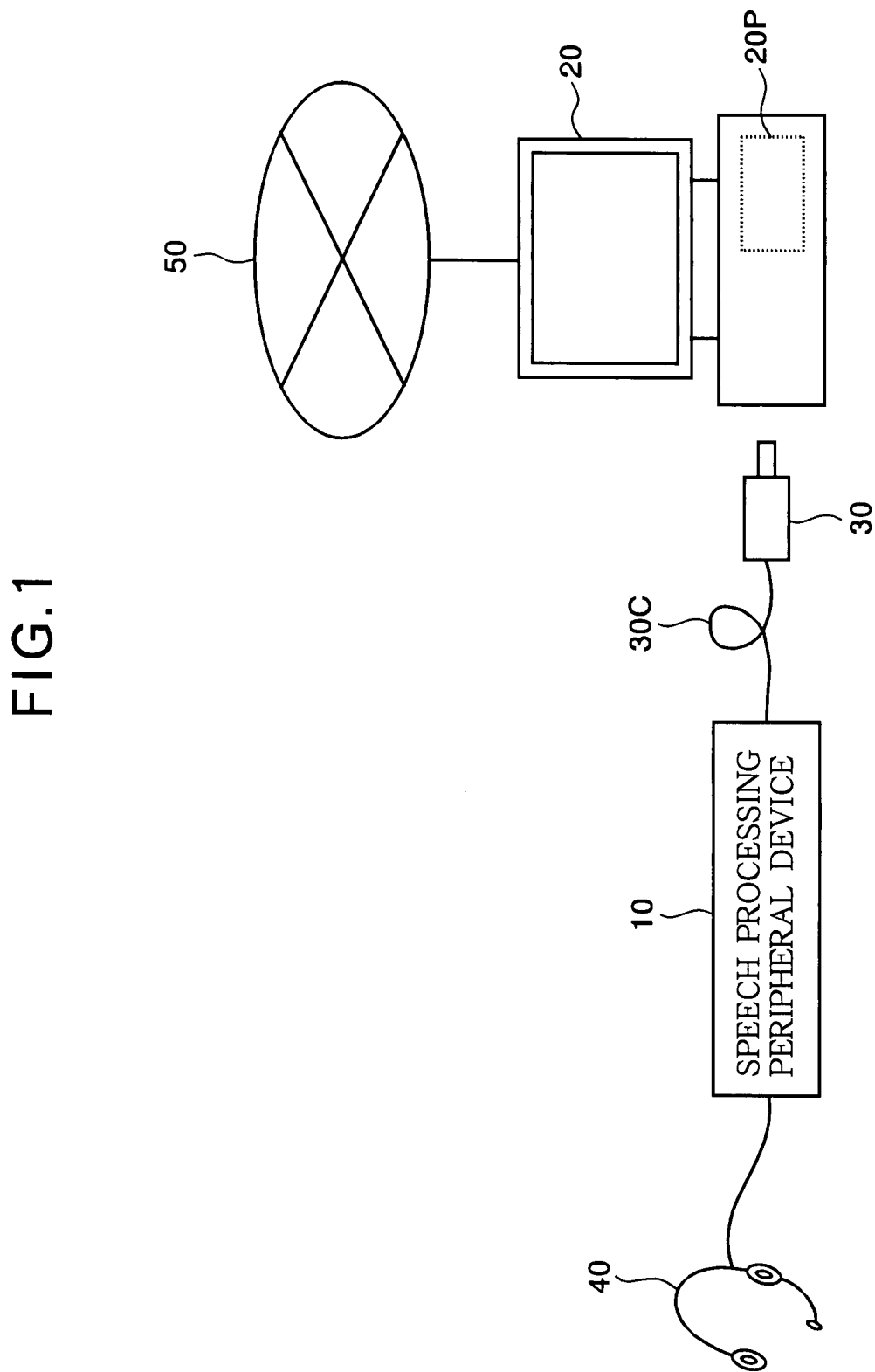
FIG. 1 is a block diagram showing a whole configuration of an IP telephone system of the first embodiment.

FIG. 1 is a block diagram showing a whole configuration of the IP telephone system of the first embodiment.

Referring to FIG. 1, an IP telephone system 1 of the first embodiment includes a speech processing peripheral device 10 of the first embodiment and a PC 20. The speech processing peripheral device 10 has a USB connector 30 at an end of a cable 30C fixed (or detachably connected) to the speech processing peripheral device 10, for example, and can be connected to the PC 20 through the USB connector 30. Further, the speech processing peripheral device 10 has a headset (or a handset) 40 fixed (or detachably connected) to the speech processing peripheral device 10. The PC 20 is connected to an IP network 50 through a LAN (not shown in the drawing) and the like.

In the first embodiment, among the VoIP call control and the speech processing in IP telephone communication, the VoIP call control is mainly performed by the PC 20, and the speech processing is mainly performed by the speech processing peripheral device 10.

The PC 20 executes a VoIP call control program 20P, thereby performing the VoIP call control other than speech processing. The VoIP call control program 20P is an application program of an existing softphone with a routine for speech processing (speech processing during a telephone conversation) excluded and with a routine for interfacing with the speech processing peripheral device 10 added. The VoIP call control program 20P performs connection processing and disconnection processing in IP telephone communication, sends/receives instructions and data to/from the speech processing peripheral device 10, performs user interface processing, and performs other processing.

The VoIP call control program 20P starts when a user clicks on the file name, and this makes the PC 20 possible to operate as a VoIP call controller. The VoIP call control program 20P may be configured not to be started directly from a VoIP call control program memory 17 but to be installed in a hard disk or the like in the PC 20 when a user clicks on the file name and then to be started from the hard disk or the like.

The speech processing peripheral device 10 has a configuration as will be described later in detail and exclusively performs speech processing of the IP telephone function. A part for performing speech processing is configured by hardware.

Call control is suitable for processing by the software. For example, an application for an address-book file for allowing an outgoing call to be sent directly from an address-book file can be easily linked with the VoIP call control program 20P. On the other hand, speech processing is suitable for processing by the hardware. Accordingly, in the first embodiment, the VoIP call control is mainly performed by the PC 20 (the CPU executes the VoIP call control program 20P), and the speech processing is mainly performed by the speech processing peripheral device 10. In the subsequent description, the PC 20, in which the VoIP call control program 20P is functioning, is also referred to as a VoIP call controller 20.

Figure 2:
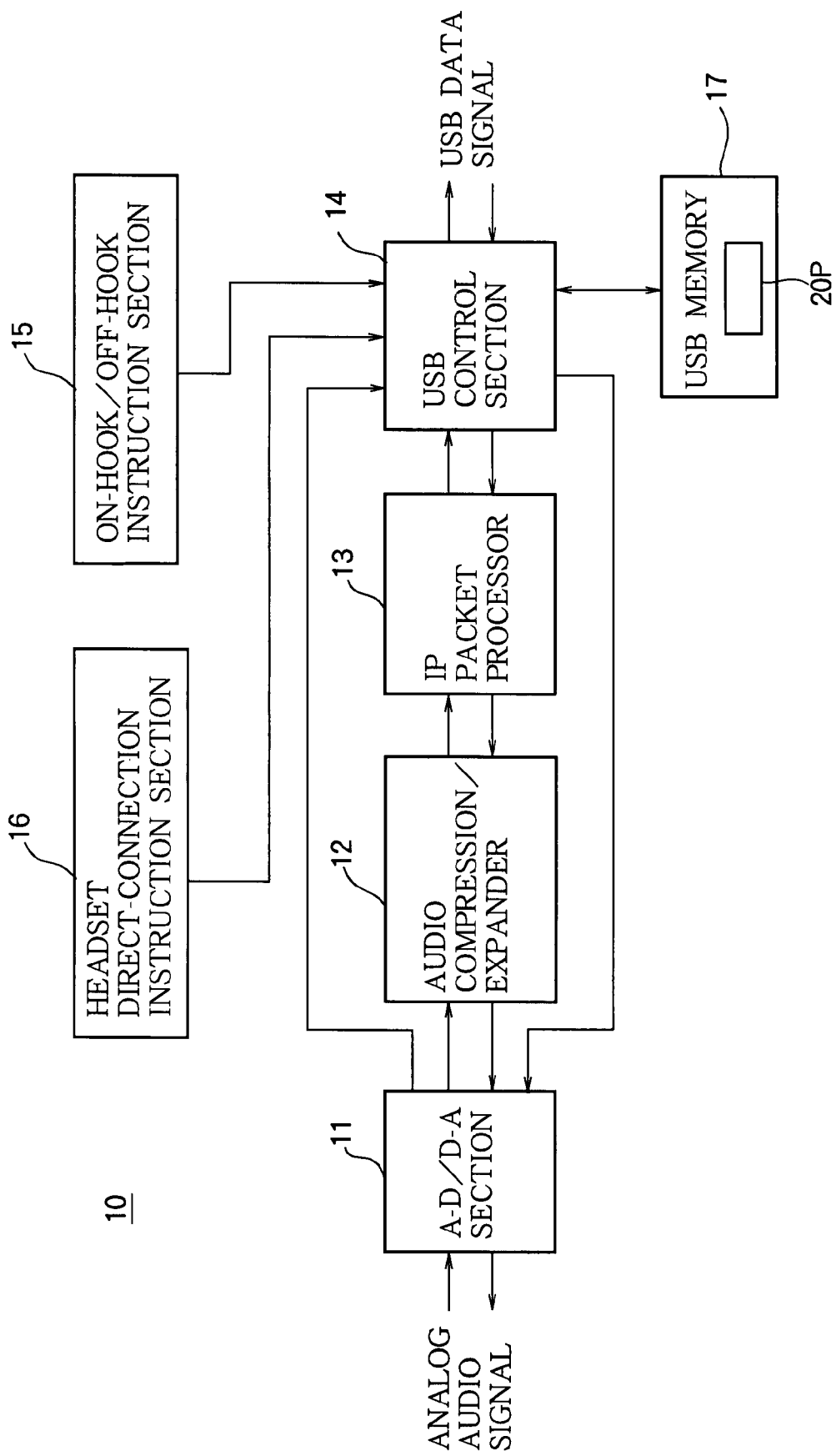
FIG. 2 is a block diagram showing a detailed configuration of a speech processing peripheral device of the first embodiment.

FIG. 2 is a block diagram showing an internal configuration of the speech processing peripheral device 10.

Referring to FIG. 2, the speech processing peripheral device 10 includes an A-D/D-A section 11, an audio compression/expander 12, an IP packet processor 13, a USB control section 14, an on-hook/off-hook instruction section 15, a headset direct-connection instruction section 16, a VoIP call control program memory 17, and so on.

The A-D/D-A section 11 converts an analog audio signal from a microphone (not shown in the drawing) of the headset 40 to a digital audio signal and sends the converted signal to the audio compression/expander 12. Also, the A-D/D-A section 11 converts a digital audio signal from the audio compression/expander 12 to an analog audio signal and sends the converted signal to a speaker (not shown in the drawing) of the headset 40.

The audio compression/expander 12 compression-encodes the digital audio signal to generate encoded audio data and sends the encoded audio data to the IP packet processor 13. Also, the audio compression/expander 12 expands encoded audio data (compression-encoded data) supplied from the IP packet processor 13, decodes the encoded audio data to generate a digital audio signal, and sends the digital audio signal to the A-D/D-A section 11.

The IP packet processor 13 converts the encoded audio data supplied from the audio compression/expander 12 to IP packets (i.e., assembles IP packets) to output the IP packets to the USB control section 14. Also, the IP packet processor 13 converts IP packets outputted from the USB control section 14 to encoded audio data (i.e., disassembles IP packets) to supply the encoded audio data to the audio compression/expander 12. The IP packet processor 13 includes a part for buffering processing of the received call data and a part for deletion/insertion processing (restoration processing of fluctuation absorption and delay), for example.

The USB control section 14 controls data transfer with the side of the VoIP call controller 20. The USB control section 14 mainly works for data transfer while the IP telephone is in a telephone conversation state. The USB control section 14 converts the IP packets supplied from the IP packet processor 13 to a USB data signal and transfers the USB data signal to the VoIP call controller 20, and sends the IP packets transferred as a USB data signal from the VoIP call controller 20 to the IP packet processor 13.

The on-hook/off-hook instruction section 15 includes an off-hook button and an on-hook button, for example, and is used for entering an off-hook instruction of a user for an incoming call, an on-hook instruction of a user for ending a telephone conversation, and the like. The on-hook/off-hook instruction section 15 is connected to the USB control section 14 and sends an on-hook instruction or an off-hook instruction via the USB control section 14 to the VoIP call controller 20. Further, the on-hook/off-hook instruction section 15 may be a device for receiving only one of the on-hook instruction and the off-hook instruction. The on-hook/off-hook instruction section may be provided not in the speech processing peripheral device 10 but in the PC (VoIP call controller) 20 alone.

The headset direct-connection instruction section 16 is a device used for entering instructions for causing the speech processing peripheral device 10 to operate as if the headset 40 and the PC (VoIP call controller) 20 are connected substantially directly. In this operation mode, a signal from the PC 20 is transmitted to the A-D/D-A section 11 by a function as a hub of the USB control section 14, and is converted to an analog signal to be supplied to the speaker of the headset 40. Further, a signal from the microphone of the headset 40 is converted to a digital signal by the A-D/D-A section 11, and then sent from the USB control section 14 to the PC 20. For example, when application processing using the headset other than the IP telephone function is performed, the function can be executed in a state as if the USB headset is connected to the PC 20, by entering instructions by using the headset direct-connection instruction section 16.

The VoIP call control program memory 17 stores a VoIP call control program 20P to be supplied to the PC 20. When the USB connector 30 is connected to the PC 20 in the power-on state or when the PC 20 to which the USB connector 30 is connected is powered on, communication between the USB control section 14 and the PC 20 in the initial state causes the VoIP call control program stored in the VoIP call control program memory 17 to be loaded to the PC 20.

(A-2) Operation of First Embodiment

The operation of the IP telephone system 1 of the first embodiment will next be described.

For example, when the USB connector 30 provided at an end of the cable extending from the speech processing peripheral device 10 is inserted into the PC 20 in the power-on state, which is not shown in the drawing, attribute information and the like is sent/received between the PC 20 and the speech processing peripheral device 10 in accordance with the USB protocol, and the PC 20 recognizes that the speech processing peripheral device 10 is connected and is brought to a state for supplying a power. The processing at this time is the same as the processing based on a normal sequence for USB devices. Further, the speech processing peripheral device 10 notifies the existence of a file of the VoIP call control program stored in the VoIP call control. program memory 17 in substantially the same way as a case where the USB memory is used. Then, the PC 20 causes the file name of the VoIP call control program to be displayed. When a user clicks on the displayed file name, the VoIP call control program 20P is installed in the PC 20, and the PC 20 is enabled to function as the VoIP call controller.

Figure 3:
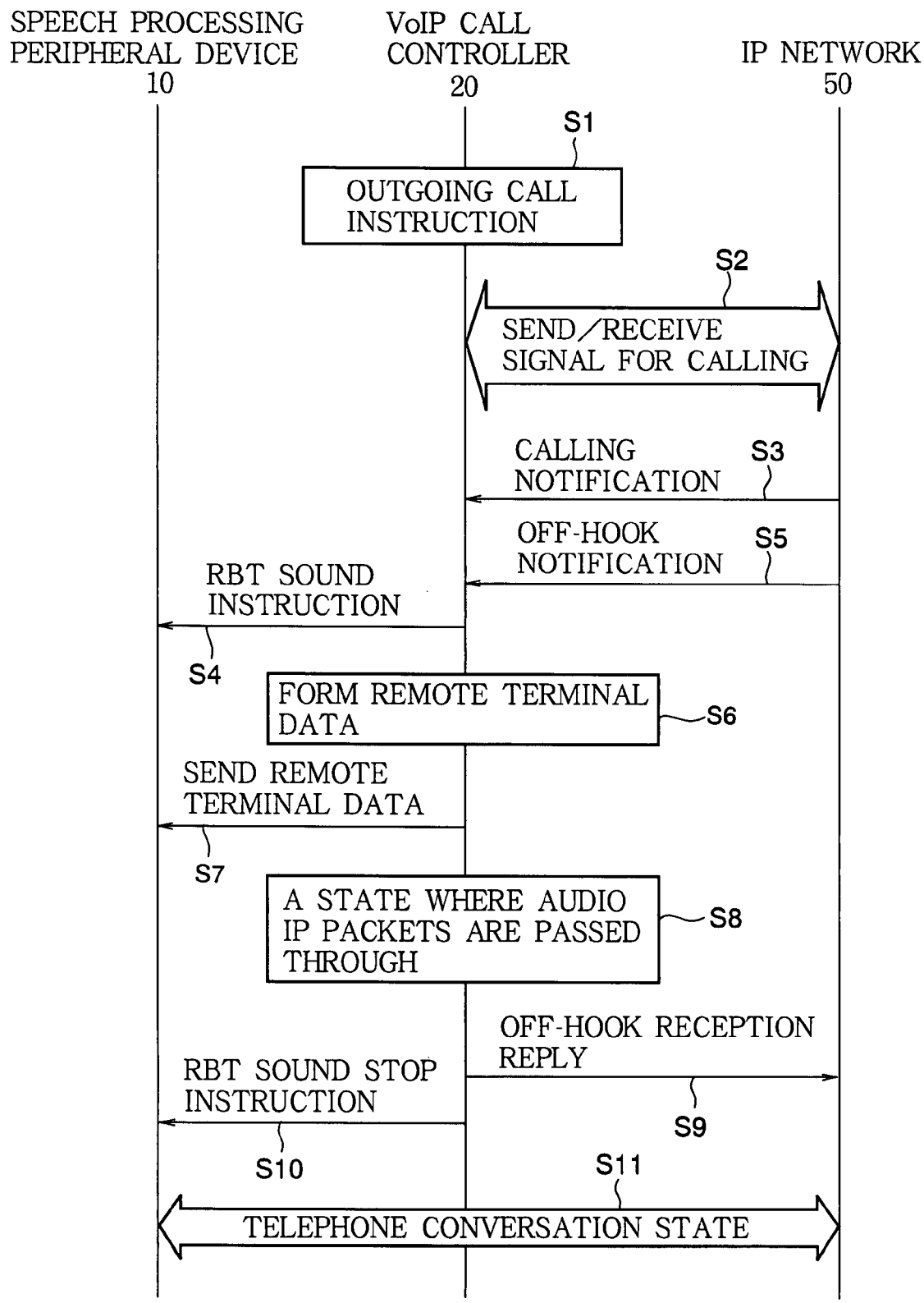
FIG. 3 is a sequence diagram showing operation at the time of an outgoing call in the IP telephone system of the first embodiment.

The operation at the time of an outgoing call of the IP telephone system 1 of the first embodiment will next be described with reference to the sequence diagram shown in FIG. 3.

For example, when the VoIP call control program 20P is active, a user inputs a far-end telephone number from a keyboard or the like and operates a key to instruct an outgoing call on the keyboard (S1). At this time, the VoIP call controller 20 sends/receives a signal for calling to/from the side of the IP network 50 (S2). The processing at this time is substantially the same as the processing of the existing softphone. The signal is sent/received to/from the side of the IP network 50 in accordance with the SIP protocol, for example.

When the VoIP call controller 20 receives a notification that the far-end terminal is in a called state, the VoIP call controller 20 performs processing to cause a RBT to sound from the speaker of the headset 40 (S3, S4).

One of the following three ways of generating the tones including a RBT, from the speaker of the headset 40 can be applied. In the following description, it is supposed that the tone is a RBT signal.

In the first way, the VoIP call controller 20 includes a tone generator for outputting a RBT signal as a digital signal, and sends the RBT signal as a serial signal to the speech processing peripheral device 10. The USB control section 14 of the speech processing peripheral device 10 that receives the RBT signal, sends the received RBT signal to the A-D/D-A section 11, causes the received RBT signal to be converted to an analog signal by the A-D/D-A section 11, and causes the sound to be outputted from the speaker of the headset 40.

In the second way, the VoIP call controller 20 includes a tone generator for outputting a compression-encoded RBT signal, and the VoIP call controller 20 turns the compression-encoded RBT signal into packets (such as RTP packets) to send the packets to the speech processing peripheral device 10. The received packets of a RBT outputted form the USB control section 14 of the speech processing peripheral device 10 are sent to the IP packet processor 13, which disassembles the packets, the compression-encoded data supplied from the IP packet processor 13 is expanded and decoded to a RBT signal by the audio compression/expander 12, the expanded decoded signal is converted to an analog signal by the A-D/D-A section 11, and the sound is outputted from the speaker of the headset 40.

In the third way, the speech processing peripheral device 10 includes a tone generator (not shown in FIG. 2) for generating a RBT signal as a digital signal, and the VoIP call controller 20 sends tone generation instructions specifying a type of tone (a RBT in this description) to the speech processing peripheral device 10. When the USB control section 14 of the speech processing peripheral device 10 receives the tone generation instructions, the tone generator, which is not shown in the drawing, sends a RBT signal as a digital signal to the A-D/D-A section 11, causes the A-D/D-A section 11 to convert the RBT signal to an analog signal, and causes the speaker of the headset 40 to output the RBT.

When the VoIP call controller 20 receives a notification from the side of the IP network 50 that the far-end terminal is brought to the off-hook state in reply to the call (S5), it sends data necessary for forming the audio IP packets including the IP address of the far-end terminal and so on, to the speech processing peripheral device 10 (S6, S7). The VoIP call controller 20 put itself in such a state that the audio IP packets from the speech processing peripheral device 10 are directly outputted to the side of the IP network 50, and the audio IP packets from the side of the IP network 50 are directly outputted to the speech processing peripheral device 10 (SB). The USB control section 14 of the speech processing peripheral device 10 receives the data needed to form the audio IP packets and sends the received data to the IP packet processor 13, which buffers the data.

Then, the VoIP call controller 20 returns a reception reply to the off-hook notification of the far-end terminal to the side of the IP network 50 (S9) and performs processing to terminate the RBT sound with respect to the speech processing peripheral device 10 (S10). Through the above processing, a telephone conversation state starts (S1).

In the telephone conversation state, the VoIP call controller 20 confirms that the IP packet from the side of the IP network 50 is an audio IP packet to send the packet to the speech processing peripheral device 10, and also confirms that the IP packet from the speech processing peripheral device 10 is an audio IP packet to send the packet to the side of the IP network 50.

In the speech processing peripheral device 10 in the telephone conversation state, an analog audio signal from a microphone (not shown) of the headset 40 is converted to a digital audio signal by the A-D/D-A section 11 and is subsequently compression-encoded by the audio compression/expander 12. After that, the encoded audio data are converted to audio IP packets by the IP packet processor 13 and transferred from the USB control section 14 to the VoIP call controller 20. Further, the audio IP packets transferred from the VoIP call controller 20 are supplied to the IP packet processor 13 through the USB control section 14, the audio IP packets are disassembled and converted to encoded audio data by the IP packet processor 13, the encoded audio data (compression-encoded data) are expanded by the audio compression/expander 12, the obtained digital audio signal is converted to an analog audio signal by the A-D/D-A section 11, and the sound is outputted from the speaker of the headset 40.

Figure 4:
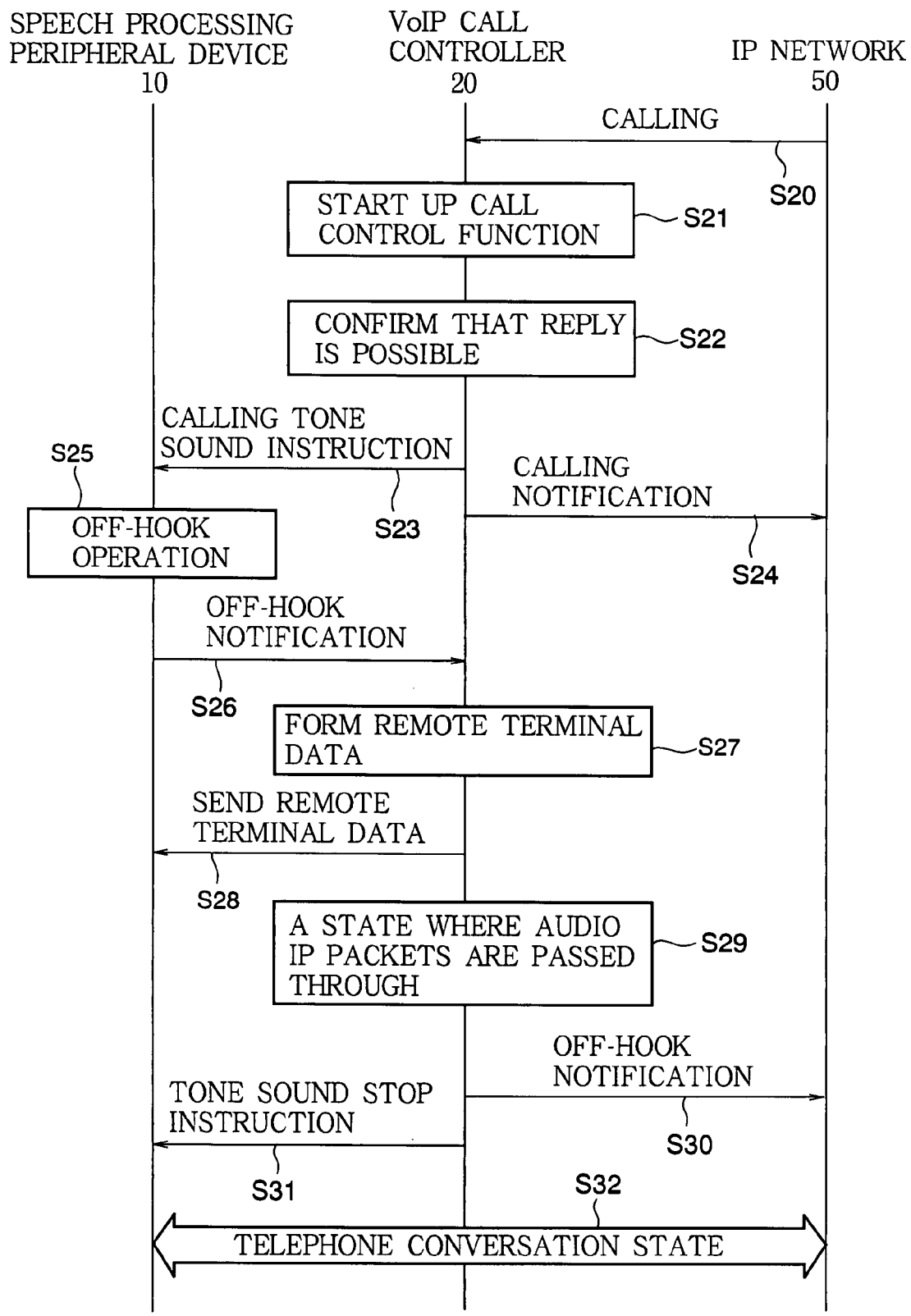
FIG. 4 is a sequence diagram showing operation at the time of an incoming call in the IP telephone system of the first embodiment.

FIG. 4 is a sequence diagram showing operation at the time of an incoming call of the IP telephone system 1 of the first embodiment.

When receiving a call control IP packet relating to a calling from the side of the IP network 50, the PC (VoIP call controller) 20 starts executing the VoIP call control program 20P as an interrupt service and starts functioning as the VoIP call controller (S20, S21).

The VoIP call controller 20 confirms that the speech processing peripheral device 10 is ready to reply the calling, such as that it is connected and is not in telephone communication with another party (S22), then performs processing to sound a calling tone from the speaker of the headset 40 (S23), and informs the side of the IP network 50 (far-end terminal) that the VoIP call controller 20 is in a called state (S24).

When the off-hook button is operated in the speech processing peripheral device 10, the USB control section 14 sends a notification of the off-hook instruction to the VoIP call controller 20 (S25, S26).

Then, the VoIP call controller 20 sends data required to form the audio IP packets, such as the IP address of the far-end terminal and the like, to the speech processing peripheral device 10 (S27, S28), and brings itself in such a state that the audio IP packets from the speech processing peripheral device 10 are directly output to the side of the IP network 50, and the audio IP packets from the side of the IP network 50 are directly output to the speech processing peripheral device 10 (S29).

Then, the VoIP call controller 20 returns an off-hook notification to the side of the IP network 50 (far-end terminal) (S30) and performs processing to stop sounding the calling tone with respect to the speech processing peripheral device 10 (S31). Through the above processing, a telephone conversation state starts (S32).

Figure 5:
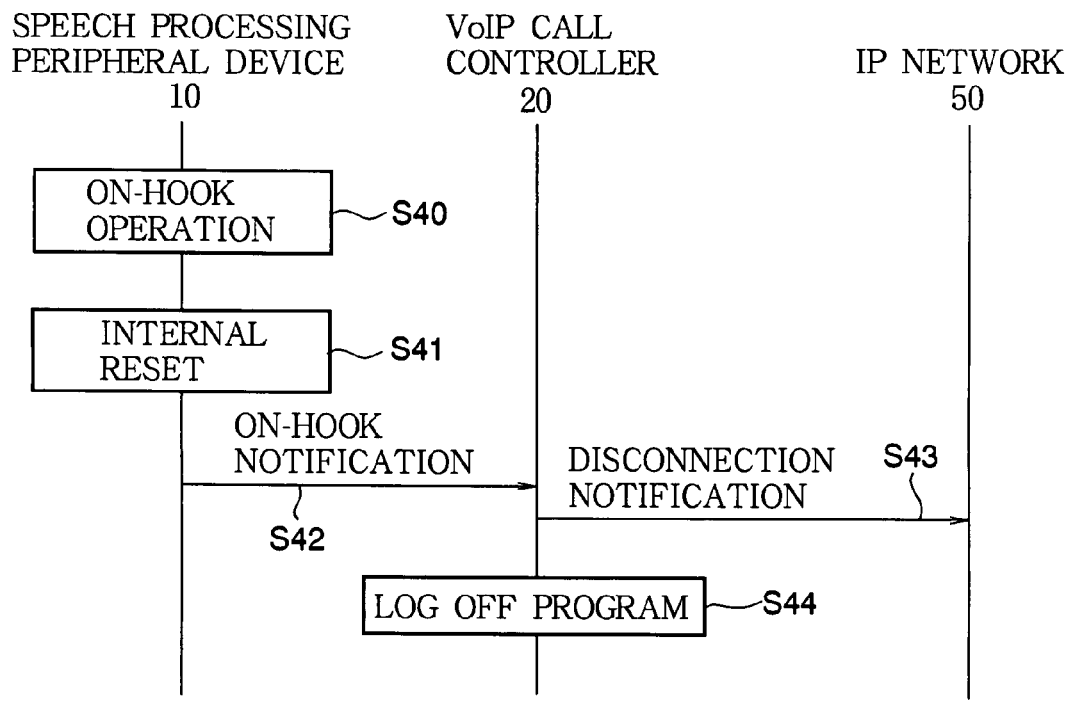
FIG. 5 is a sequence diagram showing operation at the time of disconnection in accordance with an on-hook operation in the near-end device in the IP telephone system of the first embodiment.

FIG. 5 is a sequence diagram showing operation at the time of disconnection in accordance with the on-hook operation on the side of a near-end device of the IP telephone system 1 of the first embodiment.

When the on-hook button is operated in the telephone conversation state in the speech processing peripheral device 10, the speech processing peripheral device 10 resets itself, and the USB control section 14 sends a notification of an on-hook instruction to the VoIP call controller 20 (S40 to S42).

After sending a notification of disconnection to the side of the IP network 50 (far-end terminal) (S43), the VoIP call controller 20 waits for a reception reply, and then brings the VoIP call control program 20P into a log-off state (S44).

Figure 6:
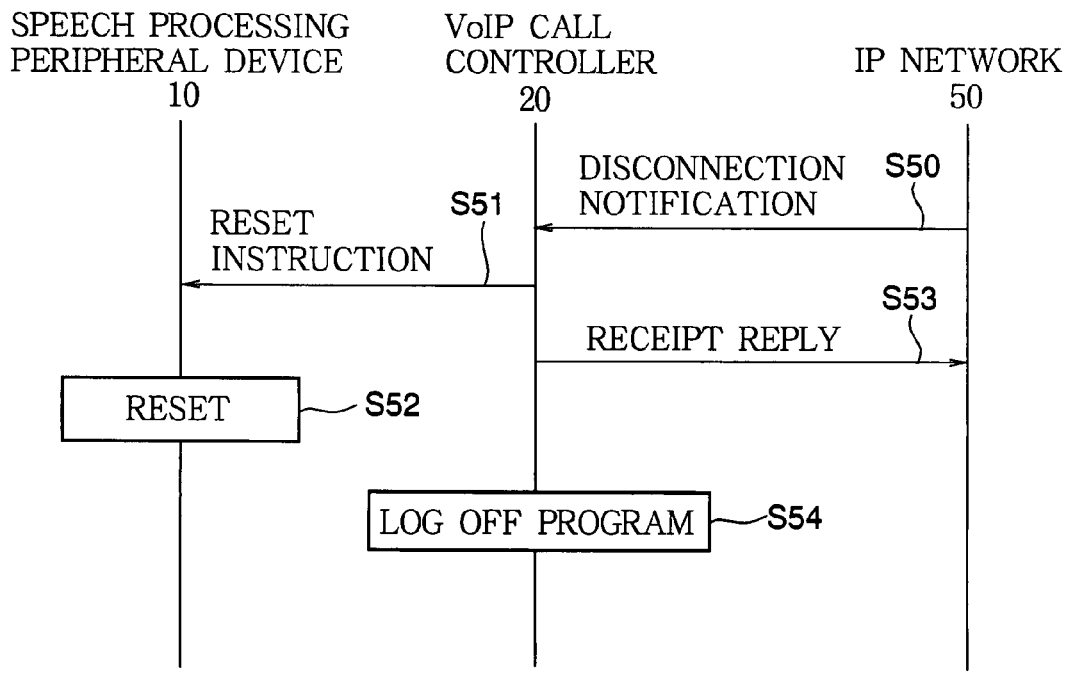
FIG. 6 is a sequence diagram showing operation at the time of disconnection in accordance with the on-hook operation on the far-end terminal side in the IP telephone system of the first embodiment.

FIG. 6 is a sequence diagram showing operation at the time of disconnection in accordance with an on-hook operation on the side of the far-end terminal of the IP telephone system 1 of the first embodiment.

The VoIP call controller 20 has already confirmed whether the IP packet received from the IP network 50 (far-end terminal) is an audio IP packet or a call control IP packet, but when a call control IP packet notifying the on-hook state (notification of disconnection) is received (S50), it sends reset instructions to the speech processing peripheral device 10 to reset the speech processing peripheral device 10 under control of the USB control section 14 (S51, S52), sends a reception reply to the notification of disconnection to the side of the IP network 50 (far-end terminal) (S53), and brings the VoIP call control program 20P into the log-off state (S54).

(A-3) Effects of First Embodiment

According to the first embodiment, the speech processing peripheral device for performing audio signal processing in a telephone conversation state is provided in addition to the PC for performing VoIP call control by software, and the PC just passes the audio signal sent/received between the speech processing peripheral device and the IP network in a telephone conversation state. Therefore, a stable speech quality can be achieved by a relatively small increase in cost, irrespective of the specifications and load state of the PC.

Further, since A-D conversion and D-A conversion of the audio signal is implemented by the external hardware device, so that noise, an echo, and the like can be avoided, a stable speech quality can be achieved independently of the characteristics of the sound board included in the PC.

On the other hand, since the VoIP call control is implemented as an application of the PC, an advantage of the softphone, which is the compatibility with software processing for sending an outgoing call from an address-book file or the like, can be inherited.

Furthermore, since the connection between the speech processing peripheral device and the PC is made by USB, the speech processing peripheral device does not need to have power supply and agrees with such a general users' image that the telephone set does not have a power supply.

In addition, since the USB connection between the speech processing peripheral device and the PC makes it easy to transfer (install) an application program (VoIP call control program) stored in the speech processing peripheral device to the PC, the speech processing peripheral device carried and connected to a different PC can easily implement the IP telephone function.

(B) Second Embodiment

A speech processing peripheral device and an IP telephone system according to the second embodiment of the present invention will be described below with reference to the drawings.

(B-1) Configuration of Second Embodiment

Figure 7:
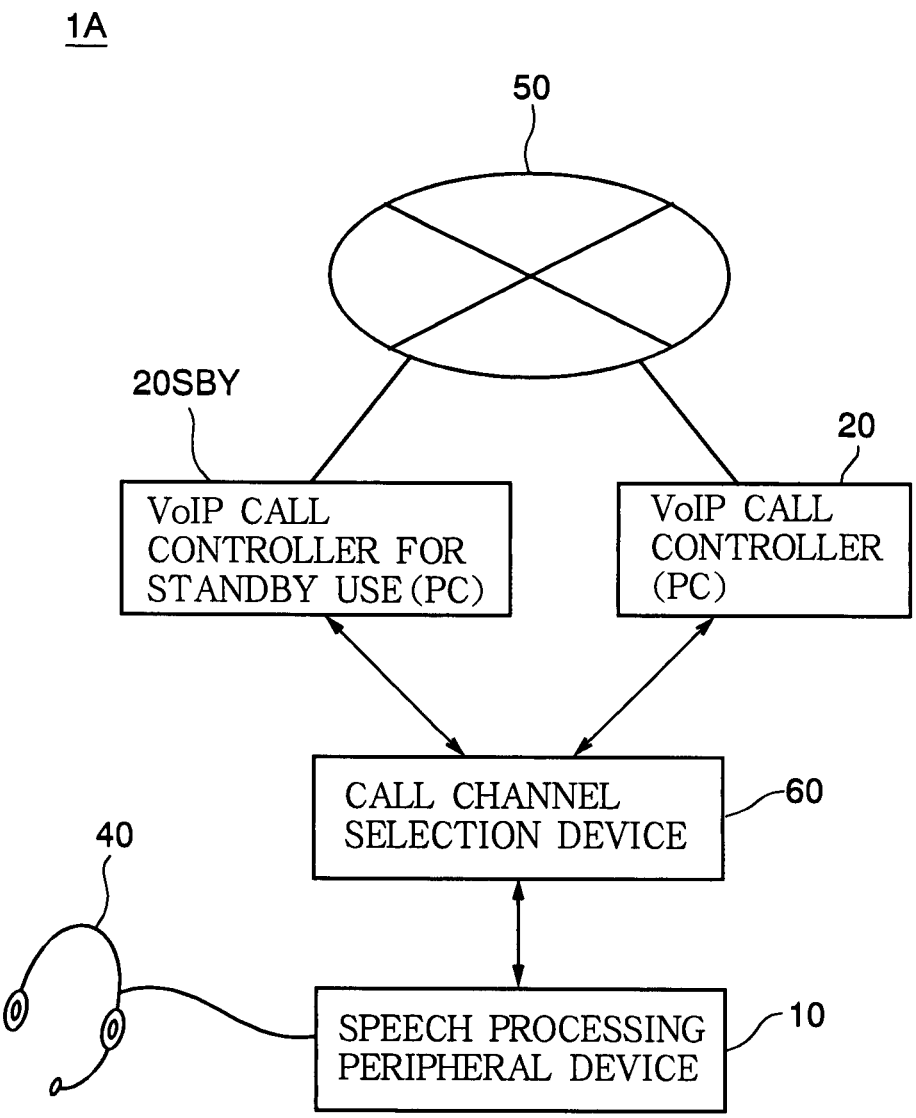
FIG. 7 is a block diagram showing a whole configuration of an IP telephone system of the second embodiment.

FIG. 7 is a block diagram showing a whole configuration of the IP telephone system of the second embodiment. Constituent elements in FIG. 7 which are the same as or correspond to those in FIG. 1 of the first embodiment are assigned the same or corresponding reference symbols.

Referring to FIG. 7, an IP telephone system 1A of the second embodiment has a redundant configuration including a VoIP call controller (PC) for active use and a VoIP call controller (PC) for standby use for executing IP telephone communication by using the speech processing peripheral device 10, and the speech processing peripheral device 10 is connected through a call channel selection device 60 to the VoIP call controller (PC) 20 for active use or the VoIP call controller (PC) 20SBY for standby use.

In FIG. 7, a case where the call channel selection device 60 is separate from the speech processing peripheral device 10 has been described, but the call channel selection device 60 may be integrated with the speech processing peripheral device 10.

Further, after the VoIP call controller 20SBY for standby use is selected, it is not always changed to the VoIP call controller for active use. The VoIP call controller 20SBY for standby use operates in place of the VoIP call controller 20 for active use only when the VoIP call controller 20 for active use cannot operate. A single call controller 20SBY for standby use may be a common standby system for different types of VoIP call controllers 20 for active use (for example, one standby system on one floor). In this case, the VoIP call controller 20SBY for standby use is connected to a plurality of call channel selection devices 60.

Figure 8:
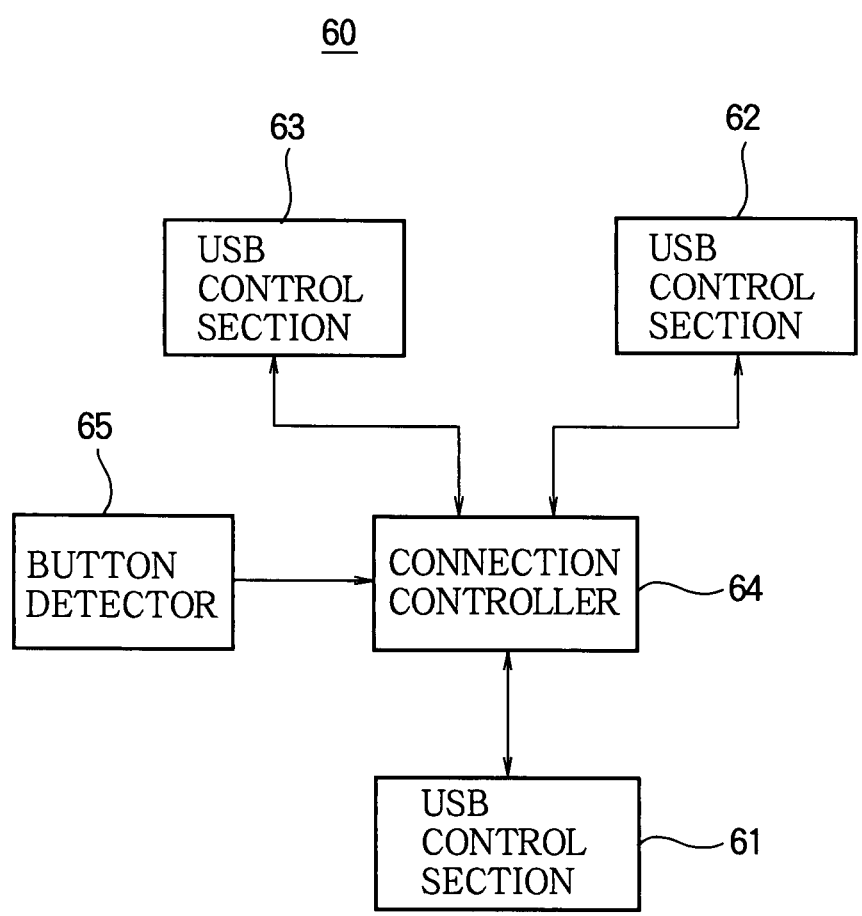
FIG. 8 is a block diagram showing a detailed configuration of a call channel selection device in the second embodiment.

The call channel selection device 60 has a configuration as shown in detail in FIG. 8. Referring to FIG. 8, the call channel selection device 60 includes three USB control sections 61 to 63, a connection controller 64, and a button detector 65.

The first USB control section 61 sends/receives a USB data signal to/from the USB control section 14 of the speech processing peripheral device 10. The second USB control section 62 sends/receives a USB data signal to/from the USB control section (not shown in the drawing) of the VoIP call controller 20 for active use. The third USB control section 63 sends/receives a USB data signal to/from the USB control section (not shown in the drawing) of the VoIP call controller 20SBY for standby use.

The connection controller 64 basically connects the speech processing peripheral device 10 and the VoIP call controller 20, i.e., the first USB control section 61 and the second USB control section 62. When the second USB control section 62 detects a disconnection with the VoIP call controller 20 or a power-down or when the button detector 65 detects the operation of a button to switch to the standby system, the connection controller 64 connects the speech processing peripheral device 10 and the VoIP call controller 20SBY for standby use, i.e., the first USB control section 61 and the third USB control section 63. In the second embodiment, the connection controller 64 has an outgoing call function for restoring a call from interruption. Further, the connection controller 64 may control connection to allow communication between the VoIP call controller 20 for active use and the VoIP call controller 20SBY for standby use. Communication between the VoIP call controller 20 for active use and the VoIP call controller 20SBY for standby use may be performed by a LAN.

The button detector 65 detects a state of buttons pressed by a user to output the state to the connection controller 64. This is used when switching to the standby system is made or when a telephone number is entered to resume a call, for example.

(B-2) Operation of Second Embodiment

Normally, the speech processing peripheral device 10 and the VoIP call controller 20 are connected so as to be able to send/receive the USB data signal. At this time, in a similar manner to the VoIP call controller 20, the VoIP call controller 20SBY for standby use is in a state that it is being connected to the far-end party (the audio data are not being sent nor received).

When an abnormality such as a stop of power supply from the VoIP call controller 20 and a USB disconnection is detected, the call channel selection device 60 connects the speech processing peripheral device 10 and the VoIP call controller 20SBY for standby use to allow the sending/receiving of the USB data signal, and the VoIP call controller 20SBY for standby use starts sending and receiving the audio data to continue the call.

Further, the VoIP call controller 20SBY for standby use may not be connected to the far-end party before the VoIP call controller 20 is switched to the VoIP call controller 20SBY for standby use, and the connection (call channel) may be established under control of the call channel selection device 60 after an abnormality in the connection to the VoIP call controller 20 is detected.

When an outgoing call or an incoming call occurs while an abnormality such as a stop of power supply from the VoIP call controller 20, a USB disconnection, or the like is being detected, the VoIP call controller 20SBY for standby use operates in substantially the same way as the VoIP call controller 20 to establish the call channel.

Furthermore, the VoIP call controller 20 and the VoIP call controller 20SBY for standby use may be configured in such a way that they can initiate an outgoing call by using the button information of the call channel selection device 60, so that a call channel with a different far-end terminal can be handled when the call channel is restored.

(B-3) Effects of Second Embodiment

According to the second embodiment, in addition to the effects of the first embodiment, the effect is obtained that the speech processing peripheral device 10 allows a call to be made even if the PC operating as the VoIP call controller 20 runs out of control or is powered down.

(C) Other Embodiments

In the embodiments described above, a case where the information processing device operating as the VoIP call controller is a PC has been described. However, an information processing device having a greater processing capacity than a PC or another information processing device having a smaller processing capacity than a PC can be used as the VoIP call controller operating in accordance with the VoIP call control program.

Further, in the embodiments described above, a case where the IP packet processor 13 is provided in the speech processing peripheral device 10 has been described, but the IP packet processor 13 may be provided on the side of the VoIP call controller (PC) 20. Since even in a telephone conversation state, it is judged whether the IP packet is an audio IP packet or a call-control IP packet, the VoIP call controller may have the functions of assembling and disassembling the audio IP packet as well. In this case, encoded audio data would be sent and received between the speech processing peripheral device 10 and the VoIP call controller (PC) 20.

Furthermore, in the embodiments described above, a case where the audio signal inputted/outputted to/from the side of the headset (handset) is an analog signal has been described, but a USB headset or the like may be used to input/output a digital audio signal through the USB or the like. In this case, the corresponding USB control section or the like must be added in the speech processing peripheral device 10.

In addition, the audio signal may be sent/received between the headset (handset) 40 and the speech processing peripheral device 10 by radio not by wire. Similarly, the signal sending/receiving between the speech processing peripheral device 10 and the VoIP call controller (PC) 20 may also be performed by radio. Further, the connection between the speech processing peripheral device 10 and the VoIP call controller (PC) 20 is not limited to the USB connection.

It is desirable that the speech processing peripheral device 10 be powered through the USB, but the power may also be separately supplied from a dedicated AC adapter, an internal battery, or the like, for example. It is also desirable that the call channel selection device 60 be powered through the USB, but the power may also be separately supplied from a dedicated AC adapter, an internal battery, or the like, for example.

In the embodiments described above, a case where the audio compression/expander 12 supports one certain compression encoding method has been described. However, several types of audio compression/expanders may also be provided to support several types of compression encoding methods, and any one of the audio compression/expanders may be selected and used in accordance with information specifying the encoding method contained in the IP packet.

Further, in the embodiments described above, a case where the speech processing peripheral device includes a headset or handset or is provided with an external headset or handset has been described. However, the speech processing peripheral device may include a built-in speaker and microphone which can be used as a sound input/output device. Further, the speech processing peripheral device may include a built-in speaker and microphone which can be used as a sound input/output device, and is provided with a headset or handset which can be enabled only when a jack of the headset or handset is inserted into the speech processing peripheral device.

In the second embodiment described above, a case where the call channel selection device 60 is provided to form the redundant configuration has been described, but the call channel selection device 60 may also be used to connect selectively one of a plurality of VoIP call controllers 20 belonging to the same grade to the speech processing peripheral device 10 (through selection operation, for example).

What is claimed is:

1. A speech processing peripheral device which is a peripheral device of an information processing device executing a call control program and functioning as a call controller, the speech processing peripheral device being connected to the information processing device, the speech processing peripheral device comprising:
   a host connection means which sends/receives an audio signal to/from the information processing device;
   a speech processing means which executes speech processing compliant with Voice Over Internet Protocol in IP telephone communication; and
   a storage means which stores the call control program to be executed by the information processing device, the call control program being an application program performing connection processing compliant with Voice Over Internet Protocol without a routine for the speech processing; wherein
   the host connection means transfers the control program to the information processing device and causes the call control program to be loaded to the information processing device, when the speech processing peripheral device is connected to the information processing device in a power-on state or when the information processing device to which the speech processing peripheral device is connected is powered on,
   the speech processing means executes thespeech processing after the information processing device performs connection processing by using the loaded call control program and a telephone conversation state starts, and
   in the telephone conversation state, the information processing device puts itself in such a state that the audio signal from the speech processing peripheral device is directly outputted to an IP network, and the audio signal from the IP network is directly outputted to the speech processing peripheral device.

2. The speech processing peripheral device according to claim 1, further comprising a means to which a sound input/output device is externally connected, wherein an uttered sound to be sent is entered into the sound input/output device and a sound based on a received audio signal is outputted from the sound input/output device.

3. The speech processing peripheral device according to claim 1, wherein the audio signal as IP packets is sent/received to/from the information processing device.

4. The speech processing peripheral device according to claim 1, further comprising a hook state instruction means, into which on-hook and/or off-hook instructions are entered, the hook state instruction means sending the on-hook and/or off-hook instructions through the host connection means to the information processing device.

5. The speech processing peripheral device according to claim 1, wherein the host connection means is connected by USB to the information processing device.

6. An IP telephone system comprising:
   an information processing device or devices which execute a call control program and functions as a call controller; and
   the speech processing peripheral device of claim 1, which is connected to the information processing device.

7. The IP telephone system according to claim 6, wherein said information processing device or devices includes two or more information processing devices; and
   the IP telephone system further comprising a call channel selection device which selectively connects any of the information processing devices to the speech processing peripheral device.

8. The speech processing peripheral device according to claim 1, further comprising:
   an IP packet processor configured to convert first encoded audio data to first IP packets to output the first IP packets to the information processing device and convert second IP packets outputted from the information processing device to second encoded audio data.

9. The speech processing peripheral device according to claim 1, wherein
   the host connection means receives data necessary for assembling first IP packets from the information processing device, sends the first IP packets assembled by the speech processing means, and receives second IP packets outputted from the information processing device,
   the speech processing means executes the speech processing by assembling the first IP packets based on the data received from the information processing device and by disassembling the second IP packets, and
   in the telephone conversation state, the first IP packets and the second IP packets are passed though the information processing device.

\* \* \* \* \*